United States Patent
Noh et al.

(10) Patent No.: US 10,505,627 B2
(45) Date of Patent: Dec. 10, 2019

(54) DEVICE USING VISIBLE LIGHT COMMUNICATIONS AND METHOD OF CONNECTING TO NETWORK USING VISIBLE LIGHT COMMUNICATIONS

(71) Applicant: LG ELECTRONICS INC., Seoul (KR)

(72) Inventors: Seunghyup Noh, Seoul (KR); Jae Myoung Lee, Seoul (KR); Hyo Suk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 15/381,191

(22) Filed: Dec. 16, 2016

(65) Prior Publication Data

US 2018/0006723 A1  Jan. 4, 2018

(30) Foreign Application Priority Data

Jun. 29, 2016 (KR) .................. 10-2016-0081725

(51) Int. Cl.
*H04B 10/116* (2013.01)
*H04W 76/15* (2018.01)
*H04W 4/70* (2018.01)
*H04W 8/26* (2009.01)

(52) U.S. Cl.
CPC .......... *H04B 10/116* (2013.01); *H04W 76/15* (2018.02); *H04W 4/70* (2018.02); *H04W 8/26* (2013.01)

(58) Field of Classification Search
CPC .............. H04B 10/116; H04Q 11/0066; H04Q 2011/0064; H04W 76/15; H04W 4/70
See application file for complete search history.

(56) References Cited

U.S. PATENT DOCUMENTS

| 7,349,325 | B2* | 3/2008 | Trzeciak | H04B 3/544 370/208 |
|---|---|---|---|---|
| 2012/0091896 | A1* | 4/2012 | Schenk | H05B 37/0245 315/132 |
| 2013/0020947 | A1* | 1/2013 | Weaver | H05B 37/0272 315/151 |
| 2013/0051264 | A1* | 2/2013 | Wang | H04L 5/0098 370/252 |
| 2014/0226977 | A1* | 8/2014 | Jovicic | H04B 10/116 398/26 |
| 2014/0313520 | A1* | 10/2014 | Naethke | G01S 1/70 356/614 |
| 2016/0218804 | A1* | 7/2016 | Raj | H04B 10/116 |
| 2016/0352422 | A1* | 12/2016 | Yue | H04B 10/116 |
| 2017/0041072 | A1* | 2/2017 | Rong | H04B 10/116 |
| 2017/0195046 | A1* | 7/2017 | Cheon | H04B 10/073 |

* cited by examiner

*Primary Examiner* — Mina M Shalaby
(74) *Attorney, Agent, or Firm* — Fish & Richardson P.C.

(57) ABSTRACT

Disclosed herein are a device using visible light communications and a method of connecting to a network using visible light communications. The device receives identification information of an initial network transmitted from a controller device connected to a target network, receives connection information of the target network from the controller device, and transmits its first identifier according to a visible light communications protocol.

9 Claims, 10 Drawing Sheets

BROADCAST NETWORK
INFORMATION(S910)

FIG. 10

TRANSMIT IDENTIFIER
ACCORDING TO VISIBLE
LIGHT COMMUNICATIONS
PROTOCOL(S920)

FIG. 11

DEVICE USING VISIBLE LIGHT COMMUNICATIONS AND METHOD OF CONNECTING TO NETWORK USING VISIBLE LIGHT COMMUNICATIONS

CROSS-REFERENCE TO RELATED APPLICATION

Pursuant to 35 U.S.C. § 119(a), this application claims the benefit of earlier filing date and right of priority to Korean Application No. 10-2016-0081725, filed on Jun. 29, 2016, the contents of which is incorporated by reference herein in its entirety.

BACKGROUND

1. Technical Field

The present disclosure relates to a device using visible light communications and a method of connecting to a network using visible light communications.

2. Description of the Related Art

As the internet of things (IoT) or machine-to-machine (M2M) communications are increasingly discussed, a variety of techniques have been proposed in association with network connection between objects and communications over such network. Further, devices capable of working as these objects are increasingly employed in a variety of industrial fields.

There are a number of techniques that allow devices such as a luminaire, a switch or the like to work as objects of IoT. In order for devices to connect to a network to perform communications, initially a device may attempt to couple with the network according to the protocol of the network. However, if there are a great number of devices in a single room or adjacent rooms, it is very inefficient to couple the devices with the network one by one. If these devices are coupled with the network automatically at a time, it is difficult to identify the devices, and there may be an error to do so.

In view of the above, exemplary embodiments of the present disclosure provide a method of connecting a device to a network by taking into account spatial properties using visible light communications, and a device implementing the method.

SUMMARY

It is an object of the present disclosure to provide a method of connecting to a network, by which identification information necessary for network setting is transmitted from the visible light communications device via visible light communications by using the initially set network information, so that the network can be installed in a room.

To carry out network move that transfers the visible light communications devices to a network appropriate for the room where they are installed, visible light communications is used. After the network move is completed, the visible light communications may be stopped.

Moreover, by using a controller device having mobility, visible light communications devices disposed in a large area can be sorted into groups each in a room, so that the network connection can be changed group by group.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a visible light communications device includes: a network communications unit configured to receive identification information of an first network and connection information of a second network from a controller device and to connect to the second network by using the connection information; a visible light communications unit configured to transmit a first identifier according to a visible light communications protocol; and a control unit configured to control the network communications unit and the visible light communications unit.

In accordance with another aspect of the present disclosure, a controller device includes: a network communications unit configured to transmit identification information of an first network and connection information of a second network over the first network; a visible light receiving unit configured to receive a first identifier of a visible light communications device according to a visible light communications protocol; a storage unit configured to store the first identifier and identification information of the visible light communications device therein; and a control unit configured to: control the network communications unit, the visible light receiving unit and the storage unit, check if the visible light communications device is coupled with the second network by using the identification information and the first identifier of the visible light communications device stored in the storage unit, and create the connection information to be transmitted to the visible light communications device.

In accordance with yet another aspect of the present disclosure, a method of connecting to a network using visible light communications includes: receiving, by a network communications unit of a visible light communications device, identification information of an first network transmitted from a controller device over the first network; transmitting, by a visible light communications unit of the visible light communications device, a first identifier according to a visible light communications protocol; receiving, by the network communications unit, connection information of the second network from the controller device over the first network; and connecting the network communications unit to the second network by using the received connection information.

In accordance with still another aspect of the present disclosure, a method of connecting to a network using visible light communications includes: transmitting, by a network communications unit of a controller device, identification information of an first network over the first network; receiving, by a visible light receiving unit of the controller device, a first identifier of a visible light communications device according to a visible light communications protocol; checking, by a control unit of the controller device, if there is another first identifier identical to the received first identifiers; and transmitting, by the network communications unit, connection information of a second network over the first network if there is no identical first identifier.

According to an exemplary embodiment of the present disclosure, a visible light communications device can be transferred to a new network by using initially set network information.

In addition, according to an exemplary embodiment of the present disclosure, a controller device checks the identification information transmitted from a visible light communications device via visible light communications, allowing for network move.

Further, according to an exemplary embodiment of the present disclosure, the identification information from a visible light communications device is transmitted to a limited distance, such that the controller device selectively controls network move of only some nearby visible light communications devices, thereby increasing accuracy.

Moreover, according to an exemplary embodiment of the present disclosure, by using the controller device having mobility, visible light communications devices disposed in a large area can be sorted into groups each in a room, so that the network connection can be changed and moved group by group. As a result, the efficiency of network setting can be increased.

It should be noted that effects of the present disclosure are not limited to those described above and other effects will be apparent to those skilled in the art from the following descriptions.

DETAILED DESCRIPTION

In the following detailed description, reference is made to the accompanying drawings that show, by way of illustration, specific embodiments in which the claimed subject matter may be practiced. These embodiments are described in sufficient detail to enable those skilled in the art to practice the subject matter. The present disclosure may, however, be embodied in many different forms and should not be construed as limited to the embodiments set forth herein.

Elements well known in the art have been omitted in order not to unnecessarily obscure the gist of the present disclosure. Like reference numerals designate like elements throughout the specification. In addition, some exemplary embodiments of the present disclosure will be described in detail with reference to the accompanying drawings. Like reference numerals designate like elements throughout the drawings. For purposes of simplicity and clarity, detailed descriptions of well-known configuration or functionality may be omitted so as not to unnecessarily obscure the gist of the present disclosure.

In describing components of exemplary embodiments of the present disclosure, terms such as first, second, A, B, (a), (b), etc., may be used. These terms are used only to differentiate a component from another component. Therefore, the nature, sequence, order, number, etc., of the components are not limited by these terms. As used herein, phrases "an element A connected to an element B" or "an element A coupled with an element B" refer to that the element A may be directly connected to/coupled with the element B, that that another element C may be interposed between the element A and the element B, and/or that the element A may be indirectly connected to/coupled with the element B via another element C.

In addition, in some implementations, features may be described as being performed by separate elements for convenience of illustration. However, these features may be implemented by a single device or module or a feature may be implemented by several devices or modules.

Hereinafter, operation and configuration of a plurality of devices located in a room, and those of a controller device controlling network connection of the devices will be described in detail. The plurality of devices located in the room may include a luminaire, an electronic product and other devices in a building. Such devices include visible light communications modules for performing visible light communications. Although luminaires are described as examples of the devices connecting to a network for convenience of illustration, this is merely illustrative. The exemplary embodiments of the present disclosure can be applied to any device using visible light communications. More than one controller device may be disposed. The controller(s) may control network connection by controlling assignment of network addresses to the devices.

Figure 1:
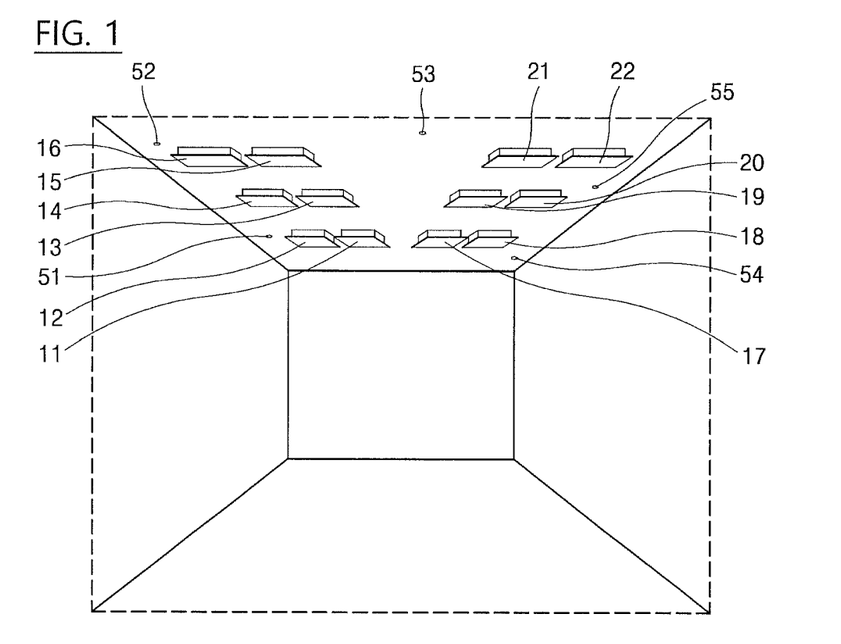
FIG. 1 is a view showing a room where an exemplary embodiment of the present disclosure is applied.

FIG. 1 is a view showing a room where an exemplary embodiment of the present disclosure is applied. In the room, a plurality of luminaires 11 to 22 is disposed. In addition to the luminaires, sensors 51 to 55 are disposed to sense changes in the room. The luminaires 11 to 22 and the sensor 51 to 55 may be disposed in a large room such as an office, and may be coupled with a network such as Zigbee or Bluetooth network and controlled remotely or centrally. Further, when the luminaires 11 to 22 and the sensors 51 to 55 are connected to the network, information can be exchanged also among the devices.

When a plurality of devices is disposed in a room as shown in FIG. 1, it is necessary to assign addresses to the devices to connect to the network. According to an existing method of registering the address information of several individual devices, all of the devices responding to the request to assign addresses are shown. As a result, it is difficult to find and register a device of interest from among the devices. In particular, when most of the devices are of the same type as shown in FIG. 1, e.g., luminaires and sensors, it is more likely to have an error in identifying and registering the devices one by one. In view of the above, according to exemplary embodiments of the present disclosure, identifiers for connecting nearby devices, e.g., a luminaire, a sensor and the like to a network are transmitted by using visible light communications, so that various kinds of devices can be registered with the network more conveniently.

Examples of devices using visible light communications include a switch, a thermometer, a clock, etc., as well as the above-described luminaires and sensor.

In addition, the controller device controlling registration of devices using visible light communications with a network may be portable devices such as a smartphone, a table PC, etc. In addition, the portable devices may be a dedicated controller device for network setting for the room. Herein, the terms a controller device, a portable device, a remote controller and the like may be used interchangeably. However, the present disclosure is not limited thereby.

Herein, examples of the network include personal area network (PAN). For example, if the network for the room is a Zigbee network using the Zigbee protocol, a router capable of conducting Zigbee communications may be an example of the controller. For another example, if the network for the room is a Bluetooth network using the Bluetooth protocol, a device capable of conducting Bluetooth communications and of working as a master device may be an example of the controller. In addition, ultra wideband (UWB) may be employed as well.

Figure 2:
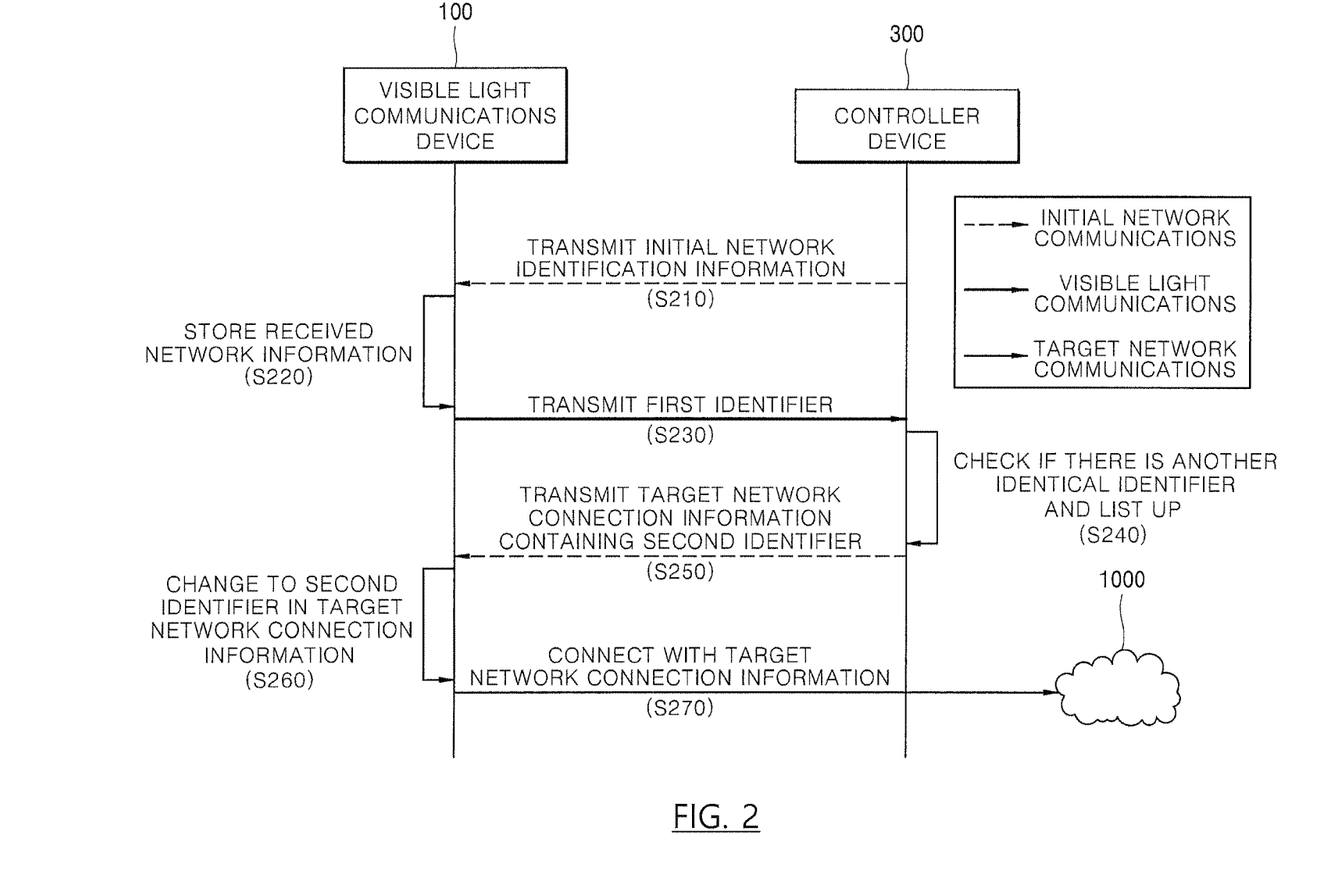
FIG. 2 is a flow diagram for illustrating a process of controlling network connection between a visible light communications device and a controller device according to an exemplary embodiment of the present disclosure.

FIG. 2 is a flow diagram for illustrating a process of controlling network connection between a visible light communications device and a controller device according to an exemplary embodiment of the present disclosure.

When a plurality of visible light communications devices 100 is disposed as shown in FIG. 1, a controller device 300 transmits initial network identification information (i.e., first network identification information) to the visible light communications device 100 over the initial network (i.e., first network)(step S210). The information may be transmitted by broadcasting, for example. In this regard, the transmitting the initial network identification information over the initial network is to allow the visible light communications device 100 to connect to the initial network by using predetermined initial network identification information. For example, the initial network to which the visible light communications device 100 connects for the first time may be a Zigbee network or a Bluetooth network.

In addition, the initial network identification information may be transmitted to a plurality of visible light communications devices 100 in the room by broadcasting. That is, the initial network identification information may be broadcast to a plurality of luminaires and sensors in the room, instead of being transmitted to the devices one by one. The initial network identification information is included in the visible light communications device 100 in advance so that the visible light communications device 100 can connect to the initial network during a manufacturing process or in a subsequent initialization state. Accordingly, the controller device 300 may transmit the network identification information in the initial state, for example, by broadcasting. When a plurality of visible light communications devices 100 is disposed in the room, the visible light communications devices 100 may receive the initial network identification information by connecting to the initial network.

The visible light communications device 100 stores the received initial network information (step S220) and transmits a first identifier to the controller device 300, which is its unique identification information (step S230). Herein, the first identifier is contained in the information that a visible light communications device 100 has and is a unique identifier that distinguishes the visible light communications device 100 from another. For example, the first identifier may be an address assigned to each of the devices such as a media access control (MAC) address. Alternatively, the first identifier may be a unique serial number which is assigned to some kinds of devices. That is, after steps S210 and S220, the visible light communications device 100 transmits the first identifier that distinguishes it from other adjacent devices by using visible light communications (step S230).

The controller device 300 receives the first identifiers from one or more visible light communications devices 100, respectively, checks if any of the received first identifiers is identical to another, and lists up the devices having first identifiers that are not identical to others (step S240). By using the first identifiers, the controller device 300 checks if a visible light communications device 100 is already coupled with a target network (i.e., second network) that the controller device 300 controls or transfers to. If there is another identical first identifier, which means that the visible light communications device 100 has already been coupled with the target network, it is determined that the target network for the visible light communications device 100 having transmitted the first identifier has been set up. On the other hand, if there is no identical first identifier, the visible light communications device 100 having transmitted the first identifier is not coupled with the target network. Accordingly, the controller device 300 creates connection information for connecting (transferring) the visible light communications device 100 having transmitted the first identifier to the target network. In doing so, the controller device 300 creates a second identifier necessary for connecting to the target network, and transmits it to the visible light communications device 100 (step S250). Step S250 is a process for connecting the visible light communications device 100 to a new target network. For the visible light communications device 100, it is a process of transferring from the initial network to the target network, i.e., the process of changing the network connection. The step S250 is also conducted in the initial network.

According to an exemplary embodiment of the present disclosure, the target network connection information transmitted in step S250 may be a modify message.

According to an exemplary embodiment of the present disclosure, the initial network is first network, and the target network is second network.

If it is determined in step S230 that the first identifier is not received, or if it is determined that there is a visible light communications device 100 that is not listed up by comparing with the currently listed visible light communications devices 100, it may return to step S210. That is, the controller device 300 may transmit the initial network identification information. For example, the controller device 300 may transmit the initial network identification information by broadcasting.

The visible light communications device 100 having received the target network connection information in step S250 modifies its identifier into the second identifier in the target network connection information (step S260), and connects to the target network 1000 by using the target network connection information (step S270). The target network connection information containing the second identifier may vary depending on the type of the target network, which will be described in detail below. In an exemplary embodiment, the controller device 300 may be connected to the target network 1000. In another exemplary embodiment, the controller device 300 may not be connected to the target network 1000. The controller device 300 serves to connect or transfer the visible light communications device 100 to the target network 1000, and thus the controller device 300 may or may not be connected to the target network 1000. The controller device 300, however, may have information on visible light communications devices 100 being connected to the target network 1000.

The process shown in FIG. 2 may be applied to the process of setting up a network in a room where a number of luminaries and sensors are disposed as follows:

The controller device 300 broadcasts common network information (identification information) that can be recognized by luminaries for which a network is set up (an example of step S210). The common network information includes preset or initially set network information such as factory default setting or initial setting. Then, when the controller device 300 transmits the initial network identification information while it is connected to the initial network, the identification information works like a trigger, so that the visible light communications devices 100 transmit their first identifiers (Unique IDs) via visible light.

Specifically, when the visible light communications devices 100 such as luminaires and sensors are installed and then power is supplied to them, the visible light communications devices 100 enter the initial state where no network is set and get ready to transmit their own identifiers, i.e., first identifiers (Unique ID) via visible light. Upon receiving identification information associated with the initial network information set during a manufacturing process, the visible light communications devices 100 transmit the identifiers via visible light.

This can be summarized as follows: The visible light communications devices 100 in the initial state receive the network information (initial network identification information) in the initial network as indicated by step S210 in FIG. 2. The information is transmitted/received via the initial network. Subsequently, the controller device 300 receives unique identifiers (first identifiers) from the nearby visible light communications devices 100 via visible light (an example of step S230). This is carried out via visible light communications. The controller device 300 determines if any of the received first identifiers is identical to a previously received identifier. If so, that is, if it is determined that a visible light communications device such as a luminaire or sensor already has a target network set for it, the first identifier information is ignored.

On the other hand, if it is determined that there is no identical identifiers among the received first identifiers, that is, a visible light communications device does not have a target network set for it, the visible light communications device is listed up (step S240). Subsequently, the controller device 300 may transmit target network connection information containing modified identification information (a second identifier, i.e., the modify identifier) to a new device, e.g., a newly installed luminaire (step S250) The information in step S250 is also transmitted in the initial network. For another example, if it is determined that the visible light communications device 100 failed to properly receive the network information, e.g., the broadcast information transmitted in step S210, the information in step S210 is retransmitted. This includes broadcasting common network information, for example, initial network information.

The modify identifier containing target network connection information transmitted in step S250 may include the first identifier in the initial state or may include other information. That is, the first identifier may be the same as or different from the second identifier. For example, if the first identifier is a MAC address, the MAC address may be included in the second identifier so as to indicate the visible light communications device that is to receive the information during the process of transmitting connection information for a new target network. In a Bluetooth or Zigbee network, if a MAC address is used to indicate a visible light communications device, the visible light communications device having the MAC address determines that the connection information indicates it and thus may perform a process of modifying the identifier for connecting to the target network, such as setting identification information required for Bluetooth or Zigbee connection.

The devices having received the target network connection information containing the second identifier (modify identifier) in step S250 modify their identifiers into the second identifiers (step S260). That is, the devices having received the second identifiers modify their identifiers into the second identifiers to be bound to the received target network information. Subsequently, the devices connect to the target network 1000 by using the target network connection information (step S270).

The transmitting/receiving information in steps S210 and S250 shown in FIG. 2 is conducted over the initial network, which is different from the target network to which the devices transfer via a process of network transfer/setting in the subsequent step S260.

Both of the initial network and the target network 1000 may be Zigbee networks that communicate data according to the Zigbee communications protocol. In another exemplary embodiment, the initial network and the target network 1000 may be Bluetooth networks that communicate data according to the Bluetooth communications protocol. In addition, the initial network and the target network 1000 may be networks that communicate data according to the ultra wideband (UWB) communications protocol.

In addition, the initial network identification information may be different from the target network connection information. The initial network identification information preset in the factory or initially set is common network information and thus cannot be applied to individual rooms. On the contrary, the target network is a PAN configured for a particular room, and thus the initial network identification information may be different from the target network connection information.

Figure 3:
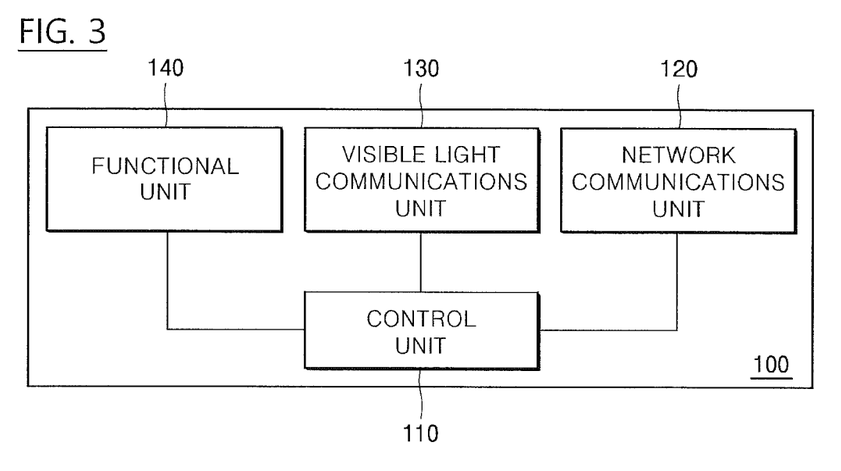
FIG. 3 is a block diagram of a visible light communications device according to an exemplary embodiment of the present disclosure.

FIG. 3 is a block diagram of a visible light communications device according to an exemplary embodiment of the present disclosure.

The visible light communications device 100 includes a control unit 110, a network communications unit 120, a visible light communications unit 130, and a functional unit 140. The network communications unit 120 receives the initial network identification information transmitted from the controller device connected to the target network in the initial network, and receives connection information necessary for connecting to the target network from the controller device in the initial network. In addition, the network communications unit 120 uses the target network connection information to connect to it.

The network communications unit 120 may include at least one of a Zigbee communications module, a Bluetooth communications module and a UWB communications module depending on the types of the initial network and the target network.

The visible light communications unit 130 transmits the first identifier according to a visible light communications protocol. The first identifier may be a MAC address of the network communications unit 120 or the control unit 110. As mentioned earlier, when the visible light communications device 100 such as luminaires and sensors is powered, the visible light communications device 100 is in the initial state where no target network is set and transmits its own identifier, e.g., a MAC address via visible light. Subsequently, after setting to the target network is completed, e.g., after connection to the target network is completed by the controller device 300, the visible light communications unit 130 may no longer transmit the first identifier via the visible light.

The functional unit 140 is an element to perform a particular function assigned to the visible light communications device 100. If the visible light communications device 100 is a sensor, the functional unit 140 is a sensing module, for example. If the visible light communications device 100 is a luminaire, the functional unit 140 is a LED module, for example.

The control unit 110 controls the network communications unit 120, the visible light communications unit 130 and the functional unit 140 so that it controls the operation of the visible light communications device 100.

The connection information received by the network communications unit 120 contains the second identifier to be used in the target network. The first identifier may be different from the second identifier. Alternatively, the second identifier may contain the first identifier and other information on the target network.

As can be seen from the descriptions made with reference to FIGS. 2 and 3, the initial network is a kind of virtual network set up during the process of manufacturing visible light communications devices 100 and may be a temporary network that transmits information on a new target network for transferring or connecting to the target network disposed in a certain room. Accordingly, the controller device 300 that controls this may store and use the information on the initial network.

The visible light communications devices 100 may use visible light communications only for a certain period of time when the controller device 300 transmits information, instead of using the visible light communications all the time. The visible light communications unit 130 is configured to transmit the first identifier that identifies the visible light communications device according to the visible light communications protocol. And, the visible light communications unit 130 can transmit the first identifier over the first network according to the visible light communications protocol.

Figure 4:
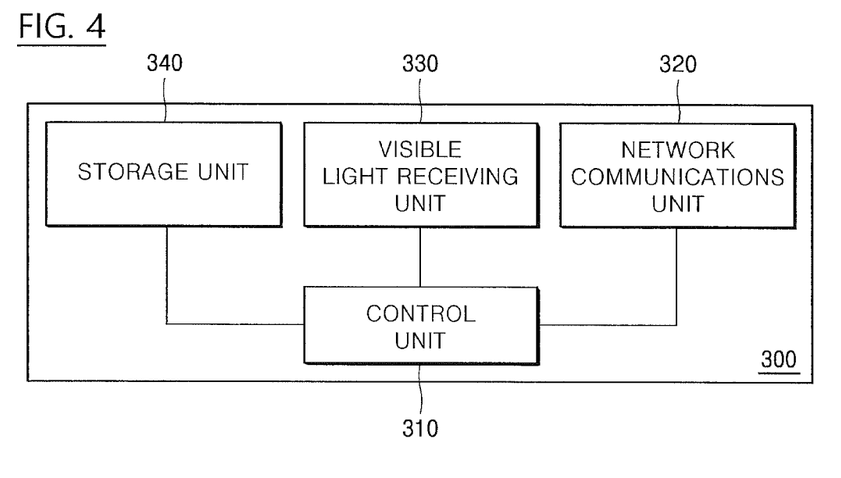
FIG. 4 is a block diagram of a controller device according to an exemplary embodiment of the present disclosure.

FIG. 4 is a block diagram of a controller device according to an exemplary embodiment of the present disclosure.

The controller device 300 includes a control unit 310, a network communications unit 320, a visible light receiving unit 330, and a storage unit 340. The network communications unit 320 transmits identification information of the initial network and connection information of the target network over the initial network. The visible light receiving unit 330 receives the first identifier of the visible light communications device according to a visible light communications protocol. As described above with reference to FIG. 2, the network communications unit 320 may transmit the identification information for the initial network by broadcasting.

The storage unit 340 stores the identification information of the visible light communications device therein. The storage unit 340 may store MAC addresses transmitted by visible light communications devices set up to the target network. The control unit 310 controls the network communications unit 320, the visible light receiving unit 330 and the storage unit 340. In addition, the control unit 310 checks if there are identical identifiers by using the identification information of the visible light communications device stored in the storage unit 340 and the first identifiers newly received by the visible light receiving unit 340. That is, the control unit 310 checks if the visible light communications device identified by the first identifier received by the visible light receiving unit 330 is coupled with the target network, and creates connection information so that the visible light communications device can connect to the target network if the visible light communications device is not coupled with the target network.

The control unit 310, the network communications unit 320, the visible light receiving unit 330, and the storage unit 340 may be configured as a single element or may be configured as separate removable elements. For example, the network communications unit 320 may be configured as a removable element such as a Zigbee communications module or a Bluetooth communications module. Similarly, the visible light receiving unit 330 may also be configured to as a removable element such as a visible light communications module.

In addition, if the controller device 300 is a device such as a smartphone or a tablet PC, a Zigbee communications module or a Bluetooth communications module for connecting to a smartphone may be coupled with the controller device 300. As described above, the visible light communications module may also be removably coupled with a smartphone or the like, and may receive visible light by using a camera of a smartphone, a tablet PC or the like. That is, an example of the visible light receiving unit 330 is a camera.

The control unit 310 and the storage unit 340 store the first identifier of the visible light communications device and may determine whether a target network is set when the identical first identifier is received later on.

In creating connection information for connecting to a target network, the control unit 310 may create the connection information including the second identifier different from the first identifier or the second identifier containing the first identifier. The stored information may be updated or deleted when a new luminaire or sensor is added or a target network is reset.

The controller device 300 may not necessary connect to the target network 1000 (see FIG. 2). The controller device 300 may provide information necessary for connecting visible light communications devices to the target network via the initial network. The visible light receiving unit 330 is configured to receive the first identifier that identifies the visible light communications according to the visible light communications protocol. And, the visible light receiving unit 330 can receive the first identifier over the first network according to the visible light communications protocol.

Figure 5:
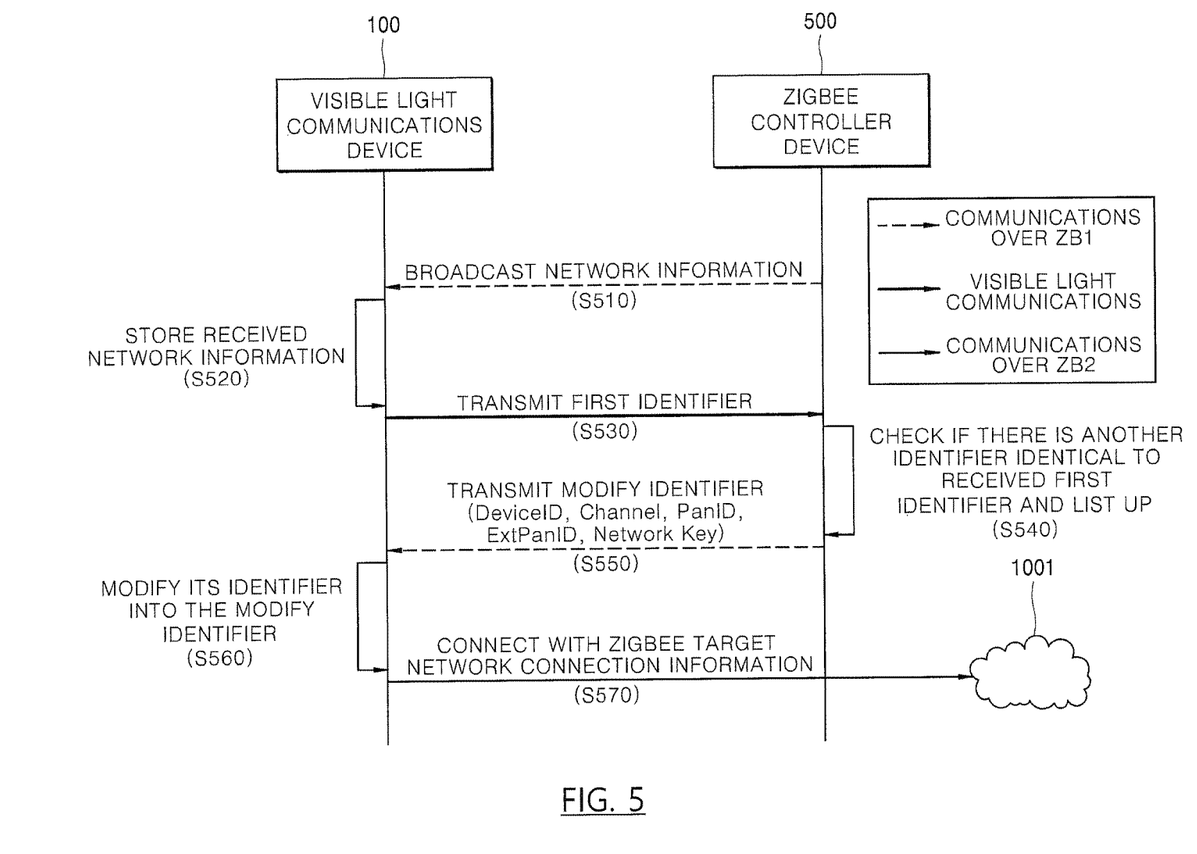
FIG. 5 is a flow diagram for illustrating a process of network connection according to visible light communications and the Zigbee protocol according to an exemplary embodiment of the present disclosure.

FIG. 5 is a flow diagram for illustrating a process of network connection according to visible light communications and the Zigbee protocol according to an exemplary embodiment of the present disclosure.

In FIG. 5, a Zigbee controller device 500 controls network connection of the plurality of visible light communications devices 100 according to the Zigbee protocol. An example of the Zigbee controller device 500 is a remote controller. Examples of the Zigbee controller device 500 include a smartphone, a tablet PC, and the like. In addition, Zigbee signals can be transmitted/received by a module capable of performing Zigbee communications connected to a smartphone, and visible light signals can be communicated with a visible light module (a visible light receiving unit) or a camera embedded in the device. The Zigbee controller device 500 may be a Zigbee router or a Zigbee coordinator. In addition, the visible light communications device may be a Zigbee end device. In another exemplary embodiment, the visible light communications device may be a Zigbee router. According to an exemplary embodiment of the present disclosure, the initial network (i.e., the first network) uses Zigbee protocol, and the target network (i.e., the second network) uses Zigbee protocol.

The Zigbee controller device 500 broadcasts the network information via an initial network ZB1 (Zigbee1) (step S510). Step S510 is carried out by using Zigbee communications. The information broadcast in step S510 is network information in the initial state that is set during the process of manufacturing the plurality of visible light communications devices 110 or the process of initial setting. The visible light communications devices 100 require connection to a target network 1001, ZB2 (Zigbee2).

Step S510 is to allow the visible light communications devices such as luminaires in the initial state where network information on the target network ZB2 is not set to connect to the target network ZB2. The transmitted information includes channel information (Channel) and a PanID.

The visible light communications device 100 having received the initial network information in the network ZB1 stores the received network information (initial network information) (step S520) and transmits the first identifier (step S530). The first identifier is an initial identifier and may be a fixed and unique identifier such as a MAC address that can distinguish a device from another. When there is no separate network setting proceeding, the visible light communications device 100 having received the information on the initial network in step S510 transmits its identifier (MAC address) to the Zigbee controller device 500 via visible light communications. This is carried out to select a nearby visible light communications device 100 from among the visible light communications devices 100 having received the initial network information, such as luminaires, by using the visible light signal received by the Zigbee controller device 500. The visible light signals from distant visible light communications devices are not received by the Zigbee controller device 500. Subsequently, the Zigbee controller device 500 checks if there is an identical identifier by using the received first identifiers (step S540). If there is no identical identifier, the visible light communications device 100 is a new visible light communications device and thus is listed up.

On the other hand, if there is another identical identifier, the following two cases are considered.

If it is determined that there is another identical first identifier and there is a history of setting to the network ZB2, the device is not listed up in the remote controller device 500, since it takes time to transfer to the Zigbee network ZB2. If the device is detected after a certain period of time, it is listed up again.

On the other hand, if there is another identical first identifier but there is no history of setting to the network ZB2, it is indicated differently. Specifically, only one of the identical identifiers is listed up in the remote controller device 500.

Subsequently, the remote controller device 500 transmits a modify identifier. The device identifier (Device ID) and a key of the Zigbee network required for connecting to the Zigbee network ZB2 are transmitted over the initial network ZB1 at the MAC address in the factory default setting, such that Zigbee communications is conducted with the target network 1001, ZB2. More specifically, the elements of the modify identifier are target network connection information for Zigbee communications. Examples of the contained information include a device identifier (Device ID), a channel information (Channel), a PanID, an ExtPanID, and a network key.

In step S550, the visible light communications device 100 having received the information modifies or changes its identifier into the modify identifier (step S560). Subsequently, the connection proceeds with the modified network information (step S570). By carrying out the process shown in FIG. 5, a luminaire, a sensor and the like in the factory default setting may be connected to the initial Zigbee network ZB1 to receive information on the Zigbee network ZB2, and then may be connected to the Zigbee network ZB2 (target network).

The exemplary embodiment shown in FIG. 5 may be summarized as follows: The Zigbee controller device 500 works as a Zigbee coordinator. It searches for a luminaire, a sensor and the like in factory default setting and connects them to the network ZB1 (initial network) in the same factory default setting. After searching for a luminaire, a sensor and the like via visible light communications, the Zigbee controller device 500 moves these visible light communications devices to the target network 1001, ZB2, and connects them to the network. The target network may be either a new network or an existing network. This corresponds to "network move" of Zigbee communications. The remote controller of the initial network ZB1 may perform the instruction to leave toward a new network ZB2, and may join the new network ZB2 or move to the existing network ZB2.

The network information broadcasting in step S510 is the network information in the factory default setting and is used to search for a visible light communications device 100 for which the target network is not set up. The modify identifier transmitted in step S550 includes connection information on the target network ZB2 to which the visible light communications device 100 is to transfer. That is, transition from the initial network ZB1 in the factory default setting to another network (target network) ZB is carried out.

Figure 6:
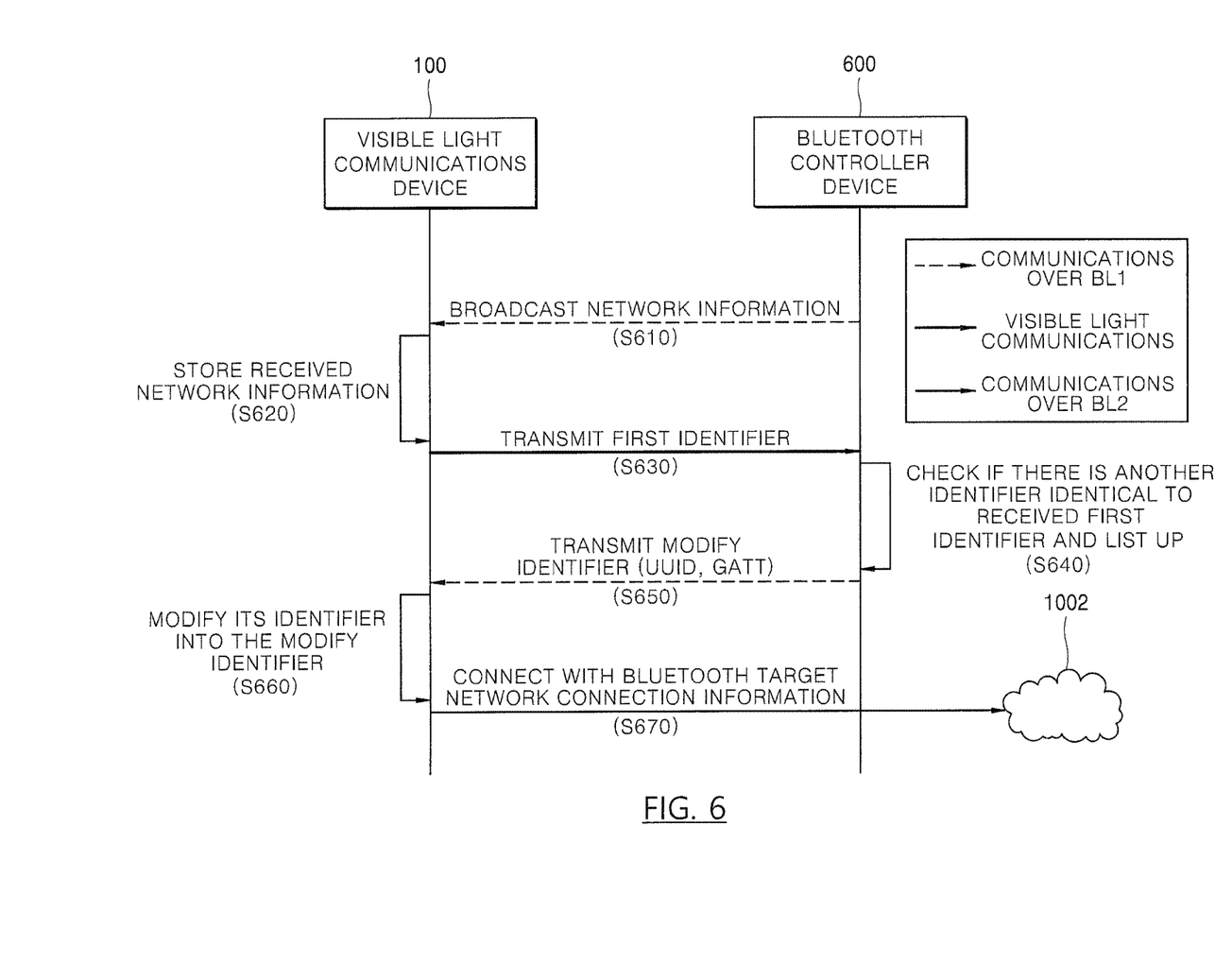
FIG. 6 is a flow diagram for illustrating a process of network connection according to visible light communications and the Bluetooth protocol according to an exemplary embodiment of the present disclosure.

FIG. 6 is a flow diagram for illustrating a process of network connection according to visible light communications and the Bluetooth protocol according to an exemplary embodiment of the present disclosure.

In FIG. 6, a Bluetooth controller device 600 controls network connection of the plurality of visible light communications devices 100 according to the Bluetooth protocol. An example of the Bluetooth controller device 600 is a remote controller. Examples of the Bluetooth controller device 600 include a smartphone, a tablet PC, and the like. In addition, Bluetooth signals can be transmitted/received by a module capable of performing Bluetooth communications connected to a smartphone, and visible light signals can be communicated with a visible light module (a visible light receiving unit) or a camera embedded in the device. The Bluetooth controller device 600 may be a master or central device. The visible light communications device may be a slave or peripheral device. In another exemplary embodiment, the visible light communications device may be a Bluetooth router.

According to an exemplary embodiment of the present disclosure, the initial network (i.e., the first network) uses Bluetooth protocol, and the target network (i.e., the second network) uses Bluetooth protocol.

The Bluetooth controller device 600 broadcasts the network information via an initial network BL1 (Bluetooth1) (step S610). Step S610 is carried out by using Bluetooth communications. The information broadcast in step S610 is network information in the initial state that is set during the process of manufacturing the plurality of visible light communications devices 110 or the process of initial setting. The visible light communications devices 100 require connection to a target network 1002, BL2 (Bluetooth2).

Step S610 is to allow the visible light communications devices such as luminaires in the initial state where network information on the target network BL2 is not set to connect to the target network BL2. The transmitted information may be a universally unique identifiers (UUID) in the factory default setting.

The visible light communications device 100 having received the initial network information in the network BL1 stores the received network information (initial network information) (step S620) and transmits the first identifier (step S630). The first identifier is an initial identifier and may be a fixed and unique identifier such as a MAC address that can distinguish a device from another. When there is no separate network setting proceeding, the visible light communications device 100 having received the information on the initial network in step S610 transmits its identifier (MAC address) to the Bluetooth controller device 600 via visible light communications. This is carried out to select a nearby visible light communications device 100 from among the visible light communications devices 100 having received the initial network information, such as luminaires, by using the visible light signal received by the Bluetooth controller device 600. The visible light signals from distant visible light communications devices are not received by the Bluetooth controller device 600. Subsequently, the Bluetooth controller device 600 checks if there is an identical identifier by using the received first identifiers (step S640). If there is no identical identifier, the visible light communications device 100 is a new visible light communications device and thus is listed up.

On the other hand, if there is an identical identifier, the following two cases are considered.

If it is determined that there is another identical first identifier and there is a history of setting to the network BL2, the device is not listed up in the remote controller device 600, since it takes time to transfer to the Zigbee network BL2. If the device is detected after a certain period of time, it is listed up again.

On the other hand, if there is another identical first identifier but there is no history of setting to the network BL2, it is indicated differently. Specifically, only one of the identical identifiers is listed up in the remote controller device 600.

Subsequently, the remote controller device 600 transmits a modify identifier. The connection information required for connecting to the Bluetooth network BL2 is transmitted over the initial network BL1 at the MAC address in the factory default setting, such that Bluetooth communications is conducted with the target network 1002, BL2. More specifically, the elements of the modify identifier are target network connection information for Bluetooth communications. Examples of the contained information include a QUID, a generic attribute profile (GATT) of the Bluetooth network.

In step S650, the visible light communications device 100 having received the information modifies or changes its identifier into the modify identifier (step S660). Subsequently, the connection proceeds with the modified network information (step S670). By carrying out the process shown in FIG. 6, a luminaire, a sensor and the like in the factory default setting may be connected to the initial Bluetooth network BL1 to receive information on the Bluetooth network BL2, and then may be connected to the Bluetooth network BL2 (target network).

The exemplary embodiment shown in FIG. 6 may be summarized as follows: The Bluetooth controller device 600 works as a master in Bluetooth communications. It searches for a luminaire, a sensor and the like in factory default setting and connects them to the network BL1 (initial network) in the same factory default setting. After searching for a luminaire, a sensor and the like via visible light communications, the Bluetooth controller device 500 moves these visible light communications devices to the target network 1002, BL2, and connects them to the network. The target network may be either a new network or an existing network.

The network information broadcasting in step S610 is the network information in the factory default setting and is used to search for a visible light communications device 100 for which the network is not set up. The modify identifier transmitted in step S650 includes connection information on the target network BL2 to which the visible light communications device 100 is to transfer. That is, transition from the initial network BL1 in the factory default setting to another network (target network) is carried out.

Figure 7:
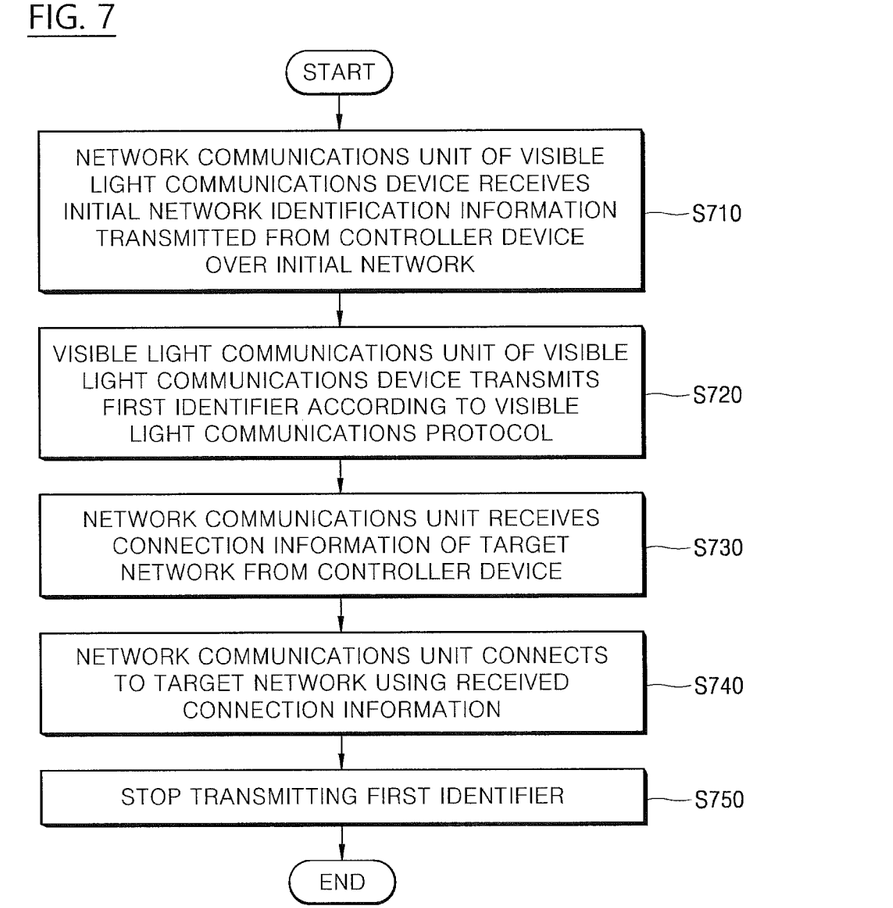
FIG. 7 is a flowchart for illustrating a process of performing network connection by a visible light communications device according to an exemplary embodiment of the present disclosure.

FIG. 7 is a flowchart for illustrating a process of performing network connection by a visible light communications device according to an exemplary embodiment of the present disclosure. The exemplary embodiments shown in FIGS. 2, 5 and 6 and the configuration shown in FIG. 3 will be referenced along with FIG. 7.

The network communications unit 120 of the visible light communications device 100 receives initial network identification information transmitted from the controller device in the initial network (step S710). Subsequently, the visible light communications unit 130 of the visible light communications device 100 transmits the first identifier according to the visible light communications protocol (step S720). The first identifier may be a MAC address of the network communications unit 120 or the control unit 110. This happens when the network communications unit 120 and the visible light communications unit 100 have MAC addresses, respectively. If the network communications unit 120 is removably coupled with a visible light communications device, the network communications device 120 may have its own MAC address independently of the visible light communications device 100. It may be preset to transmit which of the MAC addresses.

According to an exemplary embodiment of the present disclosure, the visible light communications unit 130 initiates visible light communications upon receiving the initial network identification information in step S710. According to another exemplary embodiment of the present disclosure, the visible light communications unit 130 may transmit the first identifier continuously according to a visible light communications protocol and may stop transmitting the first identifier after the network communications unit is connected to the target network as in step S740. This is carried out under the control of the control unit 110 of the visible light communications device 100.

The network communications unit 120 of the visible light communications device 100 receives target network connection information from the controller device in the initial network (step S730). Subsequently, the visible light communications device 100 uses the received connection information so that the network communications unit 120 is connected to the target network (step S740).

In step S730, the network communications unit 120 may receive connection information containing the second identifier to be used in the target network. The second identifier may be different from the first identifier or may include other additional information on the target network as well as the first identifier. In addition, the modify identifier described above with reference to FIG. 5 or 6 may be received. In addition, after the network communications unit connects to the target network, the visible light communications device may stop transmitting the first identifier via the visible light communications (step S750). This step may be optional.

Figure 8:
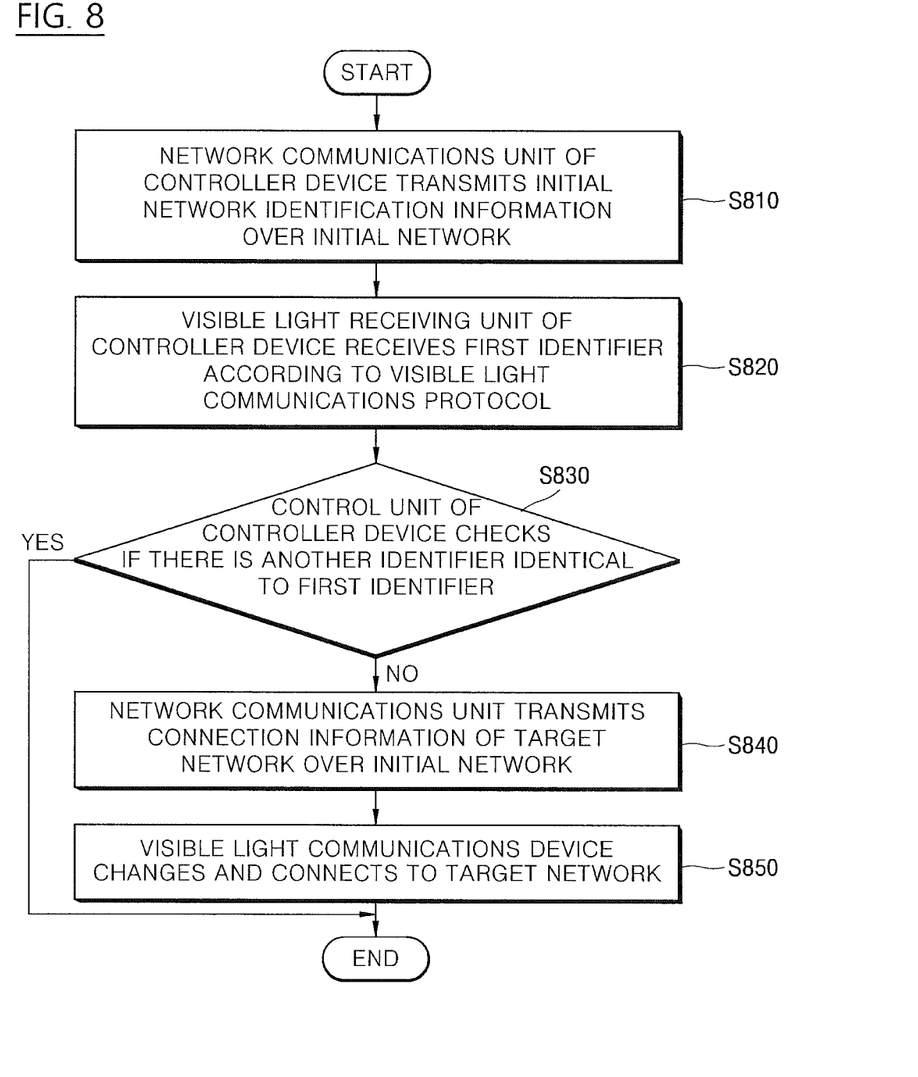
FIG. 8 is a flow diagram for illustrating a process of network connection performed by the controller device according to visible light communications and a PAN protocol according to an exemplary embodiment of the present disclosure.

FIG. 8 is a flow diagram for illustrating a process of network connection by the controller device according to visible light communications and a PAN protocol according to an exemplary embodiment of the present disclosure. The exemplary embodiments shown in FIGS. 2, 5 and 6 and the configuration shown in FIG. 4 will be referenced along with FIG. 8.

The network communications unit 320 of the controller device 300 transmits the initial network identification information over the initial network (step S810). The information may be transmitted by broadcasting. A plurality of visible light communications devices may receive the identification information. Subsequently, the visible light receiving unit 330 of the controller device 300 receives the first identifier of the visible light communications device according to the visible light communications protocol (step S820). The first identifier is used to distinguish one visible light communications device from another. An example of the first identifier is a MAC address.

The control unit 310 of the controller device 300 uses the first identifier to check if there are identical identifiers (step S830). If there is no identical identifier, i.e., if it is a new first identifier, the network communications unit 320 transmits connection information of the target network in the initial network (step S840). Subsequently, the visible light communications device changes to the target network to connect it (step S850).

In step S830, the control unit 310 and the storage unit 340 may check if there are identical identifiers. The control unit 310 checks if the first identifier is stored in the storage unit 340 of the controller device 300. If there is another identical identifier, it is determined whether to list up the device depending on whether a network is set up for it.

Figure 9:
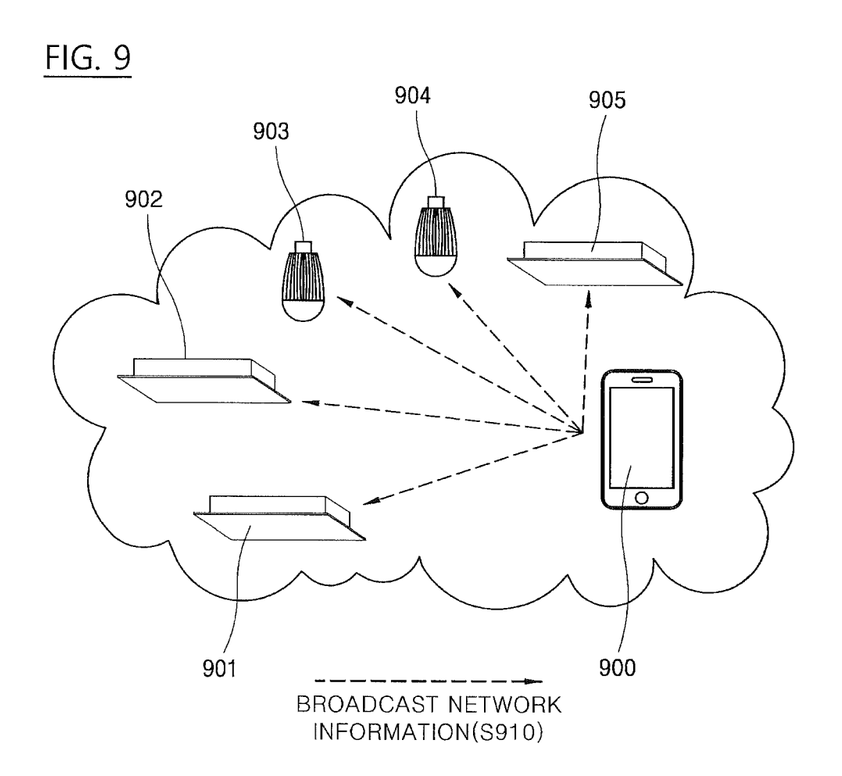
FIGS. 9 to 11 are views showing a process of transferring a visible light communications device according to an exemplary embodiment of the present disclosure from an initial network to a target network.
Figure 10:
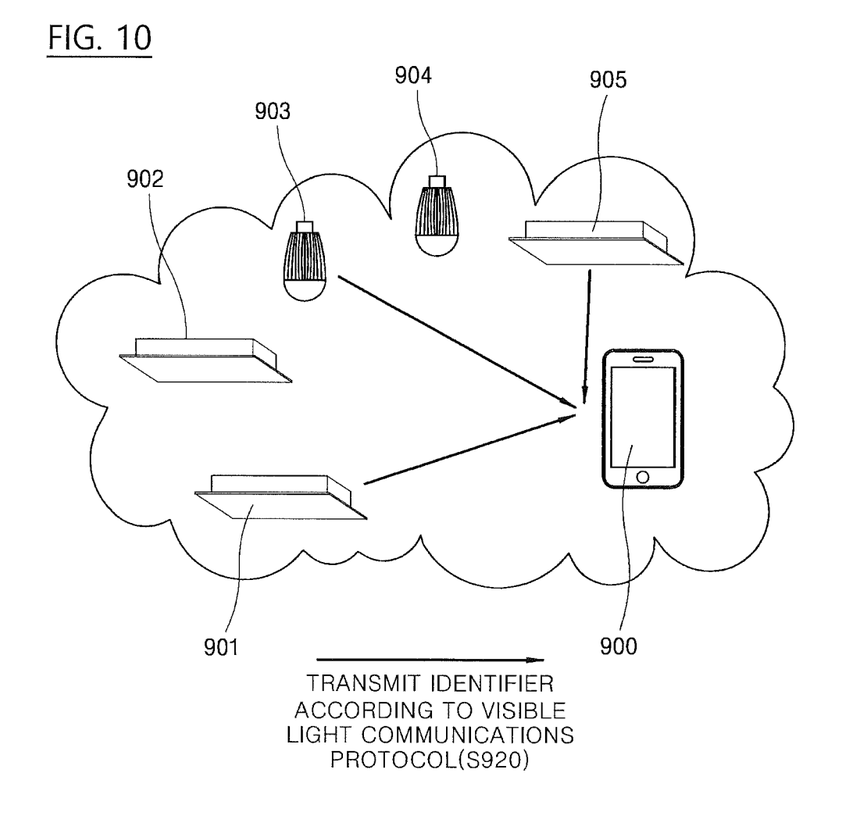
Figure 11:
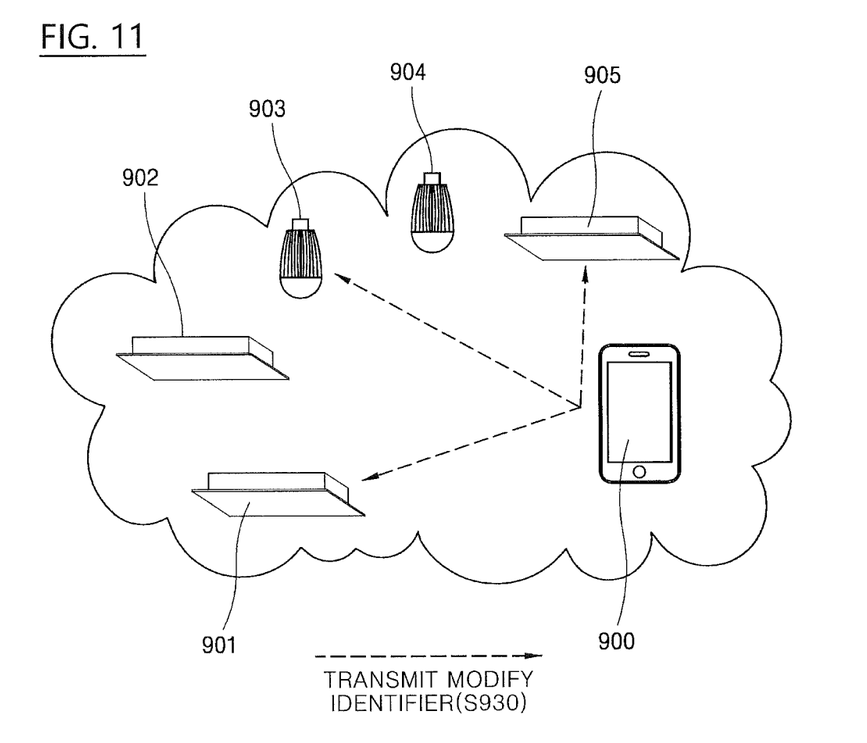

FIGS. 9 to 11 are views showing a process of transferring a visible light communications device according to an exemplary embodiment of the present disclosure from an initial network to a target network.

Referring to FIG. 9, a controller device 900 transmits initial network identification information to a plurality of visible light communications devices 901 to 905 in a room by broadcasting (step S910). As a result, as shown in FIG. 10, the visible light communications devices 901, 903 and 905 that need to newly connect to a network transmit information on their own identifiers according to a visible light communications protocol (step S920). The controller device 900 checks if there are identical identifiers by using the identifiers received according to the visible light communications protocol, and transmits a modify identifier to each of the visible light communications devices 901, 903 and 905 as shown in FIG. 11 (step S930). Each of the visible light communications devices 901, 903 and 905 may receive the modify identifier to transfer/connect to a new network.

Previously, in order to set the address of a device such as a luminaire, a sensor or the like, it is necessary to carry out a process of checking whether the luminaire detected in the network is correct one. In doing so, if there are a number of devices, an error may occur during the installation. In contrast, according to an exemplary embodiment of the present disclosure, the initial network information is broadcast, and visible light signals are transmitted from a luminaire, a sensor and the like, so that only nearby devices can be detected and registered. As a result, it is more convenient and accurate to register the devices with the network.

In addition, according to an exemplary embodiment of the present disclosure, identification information necessary for network setting is transmitted from the visible light communications device via visible light communications by using the initially set network information, so that the network can be installed in a room. Further, to carry out network move that transfers the visible light communications devices to a network appropriate for the room where they are installed, visible light communications is used. After the network move is completed, the visible light communications may be stopped.

Moreover, according to an exemplary embodiment of the present disclosure, by using a controller device having mobility, visible light communications devices disposed in a large area can be sorted into groups each in a room, so that the network connection can be changed group by group.

Although the features and elements are described in particular combinations in the exemplary embodiments of the present disclosure, each feature or element can be used alone or in various combinations with or without other features and elements. In addition, although each of the features and elements may be implemented as an independent hardware component, some or all of the features and elements may be selectively combined into one or more hardware components with a computer program having a program module that causes the hardware components to perform some or all of the functionality described herein. Codes and code segments of such a computer program will be easily conceivable by those skilled in the art. Such a computer program is stored on a computer-readable storage medium and may be read/executed by a computer to thereby implement the exemplary embodiments of the present disclosure. The storage medium of the computer program includes a magnetic storage medium, an optical storage medium, a semiconductor storage device, etc. Further, the computer program implementing the exemplary embodiments of the present disclosure includes a program module transmitted in real-time via an external device.

Although the exemplary embodiments of the present disclosure have been described for illustrative purposes, those skilled in the art will appreciate that various modifications, additions and substitutions are possible without departing from the scope and spirit of the present disclosure. Accordingly, it will be understood that such modifications, additions and substitutions also fall within the scope of the present disclosure.

What is claimed is:

1. A visible light communications device comprising:
   a network communications unit configured to:
      receive, from a controller device over a first network, (i) identification information that identifies the first network, and (ii) connection information that identifies a second network; and
      connect to the second network by using the connection information received from the controller device that identifies the second network;
   a visible light communications unit configured to transmit, to the controller device according to a visible light communications protocol, a first identifier that identifies the visible light communications device in the first network; and a control unit configured to control the network communications unit and the visible light communications unit, wherein the first identifier that identifies the visible light communications device in the first network is different from a stored identifier of the controller device, wherein the network communications unit is further configured to receive the connection information from the controller device after transmission of the first identifier and to transition from a connection to the first network to a connection to the second network after receiving the connection information, wherein the visible light communications unit is further configured to stop transmitting the first identifier after the network communications unit is connected to the second network, wherein the identification information that identifies the first network is transmitted by broadcasting, and the broadcasted identification information triggers the transmission of the first identifier, and wherein the first network is set during a process of manufacturing of the visible light communications device.

2. The device of claim 1, wherein the first identifier comprises a media access control (MAC) address of the network communications unit or a MAC address of the control unit.

3. The device of claim 1, wherein the connection information comprises a second identifier that identifies the visible light communications device in the second network, and wherein the first identifier is different from the second identifier, or the second identifier comprises the first identifier.

4. The device of claim 1, wherein both of the first network and the second network comprise:
  at least one Zigbee network that communicates data according to a Zigbee communications protocol,
  at least one Bluetooth network that communicates data according to a Bluetooth communications protocol, or
  at least one network that communicates data according to an ultra wideband (UWB) communications protocol.

5. The device of claim 1, wherein the visible light communications unit is configured to transmit, according to the visible light communications protocol, the first identifier that identifies the visible light communications device by:
  transmitting, according to the visible light communications protocol, the first identifier over the first network.

6. A method of connecting to a network using visible light communications, the method comprising:
  receiving, by a network communications unit of a visible light communications device and from a controller device over a first network, identification information that identifies the first network;
  transmitting, by a visible light communications unit of the visible light communications device and to the controller device according to a visible light communications protocol, a first identifier that identifies the visible light communications device in the first network;
  receiving, by the network communications unit and from the controller device over the first network, connection information that identifies a second network;
  transitioning, by the network communications unit, from a connection to the first network to a connection to the second network after receiving the connection information;
  connecting the network communications unit to the second network by using the received connection information that identifies the second network; and
  stopping transmission, by the visible light communications unit, of the first identifier that identifies the visible light communications device in the first network,
  wherein the first identifier is different from a stored identifier of the controller device, and
  wherein receiving, by the network communications unit and from the controller device over the first network, the connection information that identifies the second network comprises:
    receiving, by the network communications unit and from the controller device over the first network, the connection information after the transmission of the first identifier by the visible light communications unit,
  wherein the identification information that identifies the first network is transmitted by broadcasting, and the broadcasted identification information triggers the transmission of the first identifier, and
  wherein the first network is set during a process of manufacturing of the visible light communications device.

7. The method of claim 6, wherein transmitting the first identifier comprises transmitting a media access control (MAC) address of the network communications unit or a MAC address of a control unit of the visible light communications device that controls the network communications unit and the visible light communications unit.

8. The method of claim 6, wherein receiving the connection information comprises receiving the connection information comprising a second identifier that identifies the visible light communications device in the second network.

9. The method of claim 6, wherein transmitting, by the visible light communications unit of the visible light communications device and according to the visible light communications protocol, the first identifier that identifies the visible light communications device comprises:
  transmitting, according to the visible light communications protocol, the first identifier over the first network.

* * * * *